Oct. 25, 1927.
B. E. GETZ
1,646,400
ELECTRIC MOTOR
Filed July 19, 1924
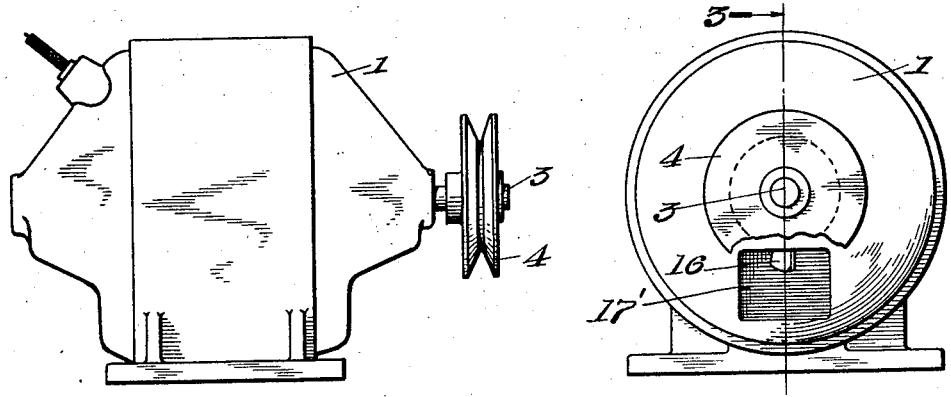
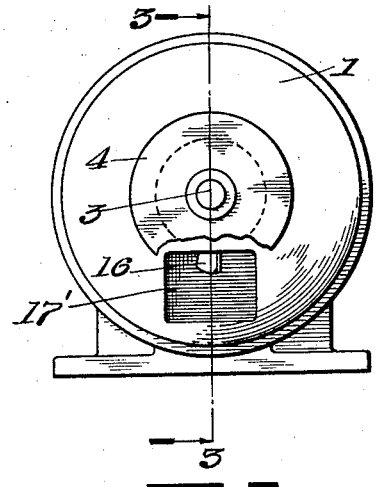
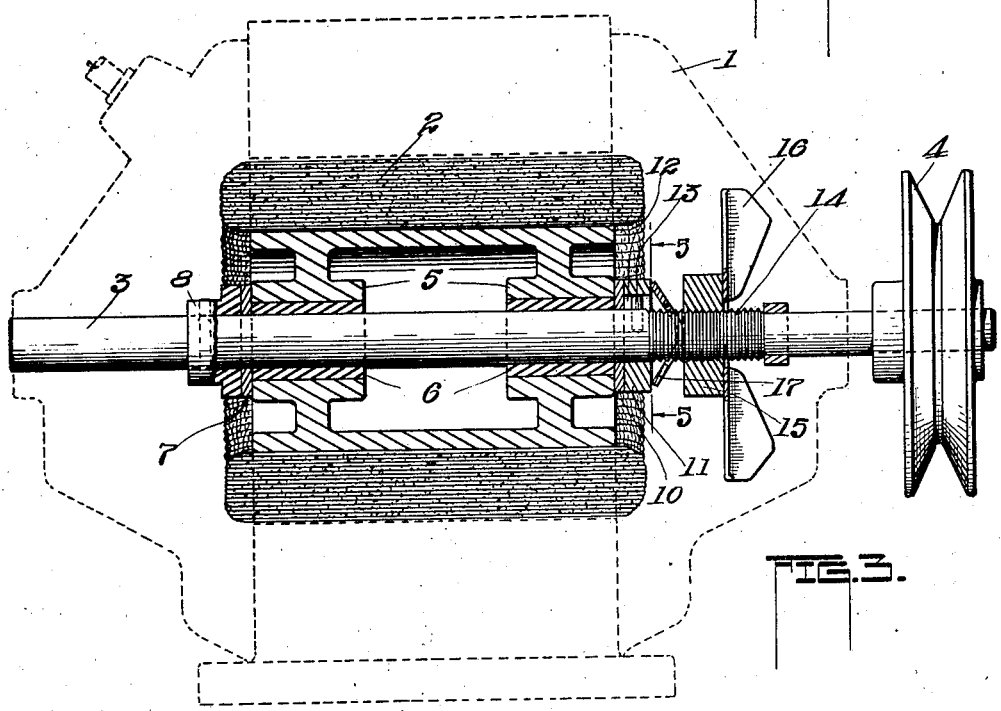
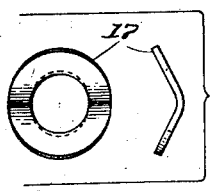
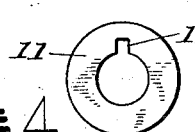

Patented Oct. 25, 1927.

1,646,400

UNITED STATES PATENT OFFICE.

BENJAMIN E. GETZ, OF MORTON, ILLINOIS.

ELECTRIC MOTOR.

Application filed July 19, 1924. Serial No. 726,973.

This invention has reference to a safety control for electric motors, and it has for its principal object to provide a control for electric motors which becomes effective automatically in case of overload and results in the motor shaft stopping instantly and the rotor or armature idling until the cause of the overload is removed. On the removal of the overload the shaft is again instantly rotated by and with the rotor or armature.

The invention is particularly applicable to electric motors used in the operation of domestic or house-hold washing machines, dish-washers, ironing machines and the like and operates to prevent the breaking or stripping of gears in the transmission or the breaking of the driving belt between the pulley wheel on the motor shaft and the pulley wheel on the driving or counter shaft, or other sensitive parts, in the event of stalling of the movement of the machine to be actuated, by reason of overload; or the stoppage, clogging or retarding of elements thereof which would place undue strain on the transmission, including the driving shaft and a driving belt, where the latter is used, and which would result in the breaking of any of such parts before the attendant could shut off the power or stop the machine.

It is a further object of the invention to connect the safety control directly with the prime mover, or in other words apply it directly to the prime mover on the inside of the motor and preferably within the armature field; also to provide an adjusting means for the control, so that in the event the rotor or armature should be left to idle for any extended length of time any wear occasioned thereby may be taken up. Furthermore, such adjustment may also be used to govern the load the motor should carry, and it is arranged so that such adjustment may be made from outside the motor.

I am further aware that it is not broadly new in electric motors capable of being used for the purposes hereinabove stated and for other uses, to provide a control in the form of a clutch for connecting the rotor or armature to the shaft, and which is releasable in the event of overload to allow the shaft to release itself from such rotor or armature and the latter to idle thereon. The objection to this type of motor is twofold. In the first place the resulting wear on the parts due to slippage will very soon reduce the pulling efficiency of the motor, and although the rotor or armature may continue to revolve at its normal speed of 1750 revolutions per minute, there is no pulling contact in the clutch, and as a result, if any power is transmitted through the shaft, it will drag and the desired effectual operation of the machinery to be actuated of no avail. Secondly, in such motors there is no means provided for taking up such wear, without tearing down or dismantling the motor and substituting new parts. This is impracticable except in the hands of experienced persons, certainly not within the knowledge of customary users of such motors.

My invention obviates and removes entirely these objections. In the first place, my control is not normally in disconnection with the rotor or armature and shaft, as is the case with motors such as I have referred to, but on the other hand normally provides a connection between the rotor or armature and shaft, causing the shaft to be instantly rotated with and by the rotor or armature; whereas, in motors such as I have referred to, the rotation of the rotor or armature sets up a centrifugal movement of clutch parts resulting in a clutching of the shaft to the rotor or armature, wherein is largely found the cause for slippage. And finally I provide an adjusting means of the very simplest character capable of being actuated from without the motor, and by the most inexperienced, so that if there is any wear due to too long idling of the rotor or armature, due to overload, it may be taken care of without dismantling of the motor.

This may be further illustrated, as follows:—In motors, embodying the objectional and inefficient features such as I have referred to, one may manually or otherwise impart a slow rotative movement to the shaft or the rotor or armature with no resulting rotative movement being imparted to the other element, which is not the case with my improvement due to the control providing a normal operative connection, resulting in the rotation of both elements, except as stated, in the event of overload. And while both controls operate to release the shaft in case of overload, I include an adjusting means to take up wear which is lacking in motors such as I have referred to.

I am aware that it is not broadly new to provide a control for accomplishing similar results in the use of washing machines, dish-washing machines, ironing machines and the like; in fact I have provided and used a control for such purposes, but all such controls so far as I am informed are not applied to or within the motor itself, as in this case, but are outside of and indirectly connected with the motor. In other words, in all such control devices with which I am familiar, in the event of overload the rotor or armature and armature shaft keep rotating and the power is broken at some remote point from the motor; whereas, in the present invention the armature shaft and its belt pulley instantly stop when the strain is too great and the rotor or armature keeps rotating or idling about the shaft until the overload is removed.

That the invention may be more fully understood, reference is had to the accompanying drawings forming a part of this description, illustrating a preferred embodiment of the invention, in which:—

Figure 1 is a side elevation, on a greatly reduced scale, showing an electric motor embodying my invention;

Figure 2 is an end elevation of Figure 1, looking in at the right hand side of said Figure;

Figure 3 is an enlarged diagrammatic and sectional view through the motor, as the same would appear on the line 3—3 Figure 2, detailing the safety control and its application to the rotor or armature and armature shaft;

Figure 4 is a face and edge view of a spring washer, and

Figure 5 is a face view of a slotted disc.

Like characters of reference denote corresponding parts throughout the figures.

No attempt is made to detail those parts of the motor other than which are included specifically in or associated with the invention itself, as such motors are becoming increasingly well known. The motor includes a casing 1, a rotor or armature 2, an armature shaft 3 on one end of which is secured a pulley wheel 4. The rotor or armature 2 is carired loosely on the shaft through hub-sleeves 5 and tightly fitting anti-friction bushings 6 therewithin. Adjacent the end of one hub-sleeve 5 and bushing 6 and on the shaft 3 within the rotor or armature is located a washer 7 made of fibre or other heat resisting material adapted to have a friction gripping relation with said hub-sleeve 5 and bushing 6 when the shaft 3 is rotating with the rotor or armature, and 8 designates a collar secured to said shaft, preferably of bronze, to hold the washer 7 in active relation with the sleeve 5 and bushing 6. Adjacent the end of the other hub-sleeve 5 and bushing 6 and on the shaft 3 within the rotor or armature is located preferably a fibre washer 10 adapted to have a friction gripping relation with said hub-sleeve 5 and bushing 6 when the shaft 3 is rotating with the rotor or armature. Next adjacent said fibre washer 10 is carried a disc 11, preferably of bronze, and said disc is provided with an internally arranged slot 12 adapted to receive a pin 13 secured to and projecting without the surface of the shaft 3.

The shaft 3 for a predetermined distance beyond the disc 11 is screw threaded, as at 14, and having a threaded adjustment thereon is a collar 15 having connected thereto a ventilating fan 16 common in motors of this character. Between the collar 15 and the disc 11 there is adjustable on the shaft 3 preferably a spring washer 17 normally bearing against the disc 11 to hold the fibre washer 10 in friction gripping relation with the hub-sleeve 5 and bushing 6. The fan 16 and its hub collar 15 may be adjusted on the threaded portion of the shaft 3 to accomplish two things. One, to take up any wear on the washers due to any extended idling of the rotor or armature caused by overload or for other reasons or to increase or decrease the tension in the spring washer and thereby govern the load the motor should carry. The motor frame or casing is provided with an opening 17', see Figure 2 for the insertion of a tool to allow for the adjustment of the fan 16 to increase or decrease the tension in the spring washer 17.

The operation of the safety control should be understood without further detailed explanation. Suffice it to say that in the use of a motor so constructed the source of power is never cut off while the current to the motor is on. The motor will start instantly without slipping, if the load is not too great for the tension placed on the control. When in operation the armature shaft and its pulley will be operated by and in unison with the rotor or armature, except in the case of overload, when the armature shaft and its pulley will stop instantly, allowing the rotor or armature to idle thereon until the overload is removed.

I am aware that overloads on motors of the character herein referred to have been guarded against by the use of fuses or by properly designed circuit breakers. By the use of my safety control in motors, I aim to avoid these as well as those indirectly applied controls previously referred to, for the reason that it becomes more and more apparent in the use of electrically operated household devices, such as I have referred to, and the like, that a more simple, automatic and effective control must be provided, requiring little or no attention to guard against slippage or breakage of parts due to overload or other causes, brought about by these machines being used or operated by inexperienced help and help having no practical training whatever.

What I claim is:—

1. In an electric motor, an armature and an armature shaft, a safety controlling means arranged under normal load to frictionally connect the shaft with said armature and to instantly release the shaft due to overload allowing the armature to idle thereon, and an adjusting means for said controlling means, including a ventilating fan, the latter being accessible from without the motor casing to regulate said adjusting means.

2. In an electric motor, an armature and an armature shaft, a driving member secured to one end of said shaft, a safety controlling means between said shaft and said armature and within the field of the latter and arranged under normal load to frictionally connect the shaft with said armature and to instantly release the shaft due to overload allowing the armature to idle thereon, and an adjusting means for said controlling means including a ventilating fan, the latter being accessible from without the motor casing to regulate said adjusting means.

3. In an electric motor, an armature and an armature shaft, a driving member on one end of said shaft, means within the field of the armature and located at its opposite ends for frictionally gripping the shaft to the armature to cause said shaft to rotate with said armature and arranged to instantly release the shaft from the armature due to overload allowing the armature to idle on said shaft, spring means to apply a yielding pressure in said friction gripping means, and means for adjusting the tension in said spring means.

4. In an electric motor, a shaft, an armature thereon, and means on said shaft, separate from said armature for frictionally connecting said armature to rotate with said shaft.

5. In an electric motor, a shaft, an armature thereon, and means on said shaft, separate from said armature for frictionally connecting said armature to rotate with said shaft, said means being adjustable longitudinally of the shaft for increasing and decreasing the frictional engagement of said connecting means.

6. In an electric motor, a shaft, an armature thereon, means on said shaft, separate from said armature for frictionally connecting said armature to rotate with said shaft, said means being adjustable longitudinally of the shaft for increasing and decreasing the frictional engagement of said connecting means and means permitting said connecting means to be adjusted exteriorly of the motor.

7. In an electric motor, a shaft, an armature thereon, means on said shaft and adjustable endwise thereof to frictionally connect the armature in rotative relation with said shaft, and other means carried by said shaft and adjustable thereon for increasing and decreasing the frictional engagement of said connecting means.

8. In an electric motor, a shaft, an armature thereon, friction gripping means on said shaft at opposite ends of the armature to frictionally connect said armature in rotative relation with said shaft, and tensioning means on said shaft at one end of said armature capable of being adjusted whereby to increase the grip between said gripping means and said armature.

9. In an electric motor, a shaft, an armature thereon, friction gripping means on said shaft at opposite ends of the armature to frictionally connect said armature in rotative relation with said shaft, tensioning means on said shaft at one end of said armature capable of being adjusted whereby to increase the grip between said gripping means and said armature and other means on said shaft for adjusting said tensioning means, said last mentioned means being adapted to be adjusted exteriorly of the motor.

10. In an electric motor, a shaft, an armature thereon, and means on said shaft, separate from said armature for frictionally connecting said armature to rotate with said shaft, such frictional connecting means permitting said armature to run loose on said shaft at times of overload on said shaft.

In witness whereof, I have hereunto affixed my hand this 19th day of July, 1924.

BENJAMIN E. GETZ.